US011521178B2

(12) United States Patent
Anderson et al.

(10) Patent No.: US 11,521,178 B2
(45) Date of Patent: Dec. 6, 2022

(54) TECHNIQUES FOR CROWDSOURCING AND DYNAMICALLY UPDATING COMPUTER-AIDED SCHEDULES

(71) Applicant: AUTODESK, INC., San Francisco, CA (US)

(72) Inventors: Fraser Anderson, Camrose (CA); George Fitzmaurice, Toronto (CA); Justin Frank Matejka, Newmarket (CA)

(73) Assignee: AUTODESK, INC., San Francisco, CA (US)

( * ) Notice: Subject to any disclaimer, the term of this patent is extended or adjusted under 35 U.S.C. 154(b) by 37 days.

(21) Appl. No.: 15/925,632

(22) Filed: Mar. 19, 2018

(65) Prior Publication Data

US 2018/0322471 A1 Nov. 8, 2018

Related U.S. Application Data

(60) Provisional application No. 62/501,360, filed on May 4, 2017.

(51) Int. Cl.
*G06Q 10/10* (2012.01)
*G06F 3/0482* (2013.01)

(52) U.S. Cl.
CPC ....... *G06Q 10/1095* (2013.01); *G06Q 10/107* (2013.01); *G06F 3/0482* (2013.01)

(58) Field of Classification Search
CPC . G06Q 10/1095; G06Q 10/107; G06F 3/0482
See application file for complete search history.

(56) References Cited

U.S. PATENT DOCUMENTS

| 8,489,615 B2 * | 7/2013 | Dhara | G06Q 10/1095 |
| | | | 707/748 |
| 2005/0050061 A1 * | 3/2005 | Karstens | G06Q 10/109 |

(Continued)

FOREIGN PATENT DOCUMENTS

KR 20050048468 * 10/2004

OTHER PUBLICATIONS

Yoon, Seung Won, and Scott D. Johnson. "Phases and patterns of group development in virtual learning teams." Educational Technology Research and Development 56.5-6 (2008): 595-618. (Year: 2008).*

*Primary Examiner* — Patricia H Munson
*Assistant Examiner* — Hamzeh Obaid
(74) *Attorney, Agent, or Firm* — Artegis Law Group, LLP

(57) ABSTRACT

In various embodiments, a scheduling application automatically determines the timing of linearly dependent events. In operation, the scheduling application detects that a first event included in an original scheduled sequence of events has not completed by a scheduled completion time based on a current time. The scheduling application then determines that a second event included in the original scheduled sequence of events has a dependency on the completion of the first event. Subsequently, the scheduling application updates one or more temporal properties associated with the second event based on the current time to generate a third event. The scheduling application then generates, via a processor, a modified scheduled sequence of events that includes the third event instead of the second event. Advantageously, automatically adjusting the timing of linear dependent events based on the current time reduces inefficiencies associated with conventional scheduling techniques.

22 Claims, 4 Drawing Sheets

(56) References Cited

U.S. PATENT DOCUMENTS

| | | | |
|---|---|---|---|
| 2006/0224430 A1* | 10/2006 | Butt | G06Q 10/063116 |
| | | | 705/7.16 |
| 2007/0124682 A1* | 5/2007 | Fukeda | G06Q 10/109 |
| | | | 715/730 |
| 2008/0040187 A1* | 2/2008 | Carraher | G06Q 10/109 |
| | | | 705/7.19 |
| 2009/0006161 A1* | 1/2009 | Chen | G06Q 10/1095 |
| | | | 705/7.19 |
| 2010/0153160 A1* | 6/2010 | Bezemer | G06Q 10/0631 |
| | | | 705/7.12 |
| 2011/0072362 A1* | 3/2011 | Denner | G06Q 10/109 |
| | | | 715/751 |
| 2012/0011205 A1* | 1/2012 | Paulsami | G06Q 10/1095 |
| | | | 709/206 |
| 2013/0139071 A1* | 5/2013 | Hoff | G06F 16/285 |
| | | | 715/756 |
| 2014/0032255 A1* | 1/2014 | Hegazi | G06Q 10/06312 |
| | | | 705/7.22 |
| 2014/0067455 A1* | 3/2014 | Zhang | G06Q 10/109 |
| | | | 705/7.24 |
| 2014/0108085 A1* | 4/2014 | Henriksen | G06Q 10/1095 |
| | | | 705/7.19 |
| 2015/0213411 A1* | 7/2015 | Swanson | G06Q 10/1095 |
| | | | 705/301 |
| 2016/0124909 A1* | 5/2016 | Basson | G10L 21/16 |
| | | | 715/732 |
| 2017/0061360 A1* | 3/2017 | Rucker | G06Q 10/063114 |
| 2017/0308866 A1* | 10/2017 | Dotan-Cohen | H04L 43/0876 |
| 2018/0039951 A1* | 2/2018 | Wynn | H04N 7/15 |
| 2018/0189743 A1* | 7/2018 | Balasubramanian | |
| | | | G06Q 10/1095 |
| 2018/0232705 A1* | 8/2018 | Baker | G06F 3/0482 |

* cited by examiner

Delegation Email 210:

Dear Mike,

In preparation for the upcoming group meeting, please estimate how long you would like to present and click the corresponding link:

Short (1-5 minutes): http://www.schedulinghost.com/response.php?delegate=Mike&length=s
- E.g., brief updates, little feedback expected, no computer necessary Medium (5-10 minutes): http://www.schedulinghost.com/response.php?delegate=Mike&length=m
- E.g., lengthier updates, a computer may be used Long (10-20 minutes): http://www.schedulinghost.com/response.php?delegate=Mike&length=l  ← Long Response Link 220
- E.g., demo, new project idea, video Reject (not presenting): http://www.schedulinghost.com/response.php?delegate=Mike&length=r You can view the schedule and update your choice below:
http://www.schedulingHost.com/progression.php?preview=true Thanks,
Jose

Long Response Webpage 230:

Topic: _____

☐ Need to project?

[ SUBMIT > ]

FIGURE 2

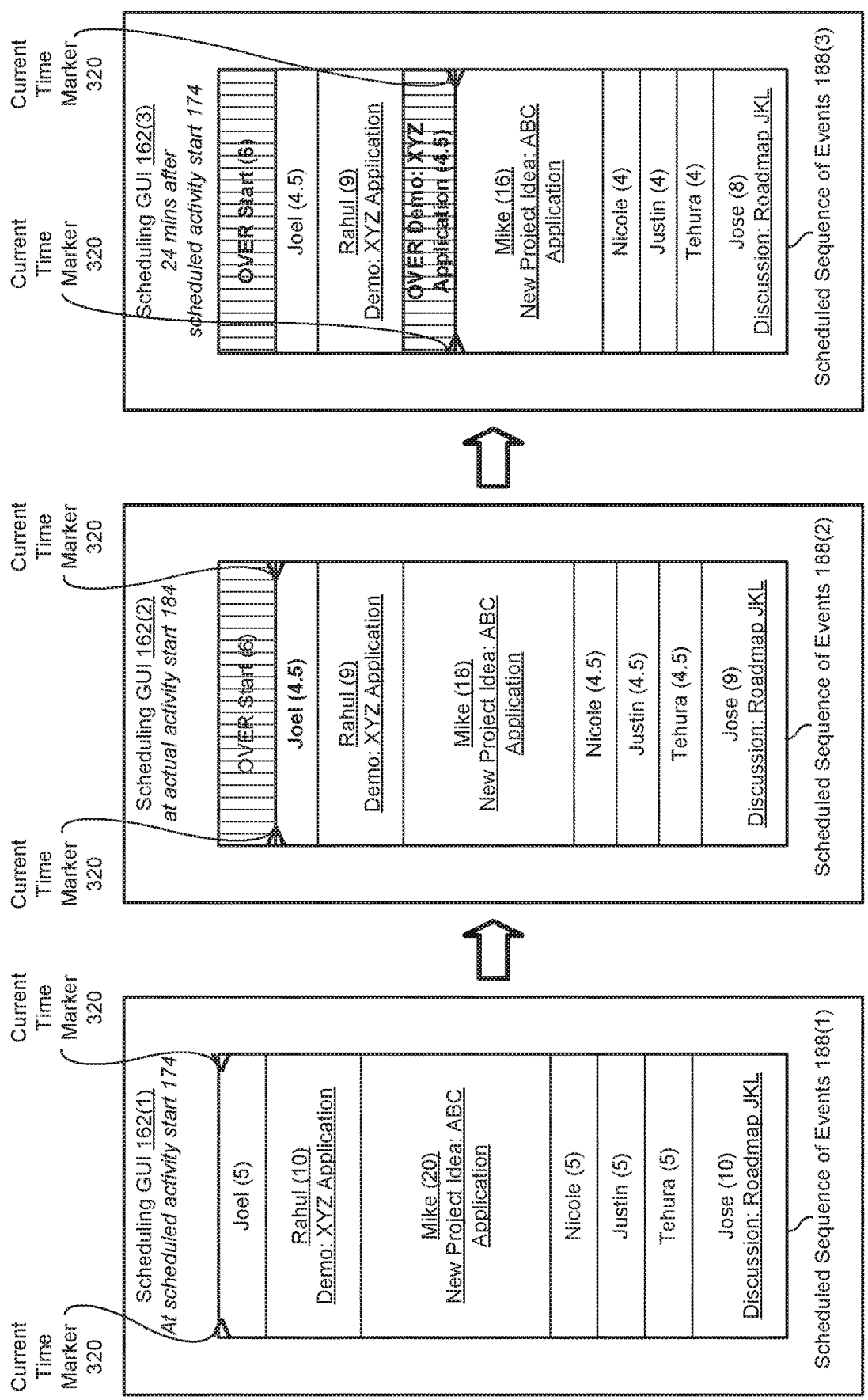

TECHNIQUES FOR CROWDSOURCING AND DYNAMICALLY UPDATING COMPUTER-AIDED SCHEDULES

CROSS-REFERENCE TO RELATED APPLICATIONS

This application claims priority benefit of the United States Provisional patent application titled, "MEETING-SMLR: A TOOL FOR ORGANIZING AND CONDUCTING MEETINGS," filed on May 4, 2017 and having Ser. No. 62/501,360. The subject matter of this related application is hereby incorporated herein by reference.

BACKGROUND

Field of the Various Embodiments

Embodiments of the present invention relate generally to computer networking and software and, more specifically, to techniques for crowdsourcing and dynamically updating computer-aided schedules.

Description of the Related Art

Meetings are common, daily occurrences in most corporations. Meetings are conducted for a wide variety of reasons. For example, a meeting may be conducted for any combination of sharing information, brainstorming, planning, decision making, etc. Because of the amount of time spent by employees in meetings, the cost associated with meetings can be a substantial percentage of the operating costs of a typical corporation. To optimize the employee time spent attending meetings, meeting organizers oftentimes attempt to organize and conduct effective meetings based on different agendas.

Typically, the organizer creates an agenda manually, allocating a different portion of the meeting time to each agenda item that is to be addressed during the meeting. Examples of agenda items include updates, presentations, and demonstrations, to name a few. The organizer then reserves any required meeting resources (e.g., conference room, projector, etc.), and emails meeting invitations. During the meeting, the organizer attempts to structure the interactions of the attendees based on the overarching agenda(s) for that meeting.

One drawback of the above approach is that timing the linearly dependent agenda items is challenging and often leads to meeting inefficiencies. For example, the organizer could allocate five minutes for a status update from a particular attendee without realizing that the attendee wishes to discuss a design decision, which can take far longer than five minutes. During the meeting, the attendee could disregard the agenda and continue to solicit feedback on the design decision past the time allotted for his/her status update. As a result, other, potentially more important, agenda items may not be addressed during the meeting and other attendees may become frustrated with the meeting and/or disengaged from the meeting.

If the organizer is manually tracking and managing the meeting time, then the organizer can interrupt meeting participants as they speak in the meeting in an attempt to reduce discrepancies between the actual durations and scheduled durations of the agenda items for the meeting. For example, if the actual duration of an agenda item were to exceed the scheduled duration of the agenda item by more than five minutes, then the organizer could draw the attention of the attendees to the current time and proceed to address the next agenda item. However, manually tracking agenda items and managing the overall meeting process in such a fashion is distracting to the organizer and reduces the ability of the organizer to benefit from and contribute to the meeting.

As the foregoing illustrates, what is needed in the art are more effective techniques for managing meetings in real-time.

SUMMARY

One embodiment of the present invention sets forth a computer-implemented method for automatically determining the timing of linearly dependent events. The method includes detecting that a first event included in an original scheduled sequence of events has not completed by a scheduled completion time based on a current time; determining that a second event included in the original scheduled sequence of events has a first dependency on the completion of the first event; updating one or more temporal properties associated with the second event based on the current time to generate a third event; and generating, via a processor, a modified scheduled sequence of events that includes the third event instead of the second event.

At least one advantage of the disclosed techniques relative to prior art is that automatically detecting when an event has not completed as scheduled and rescheduling subsequent event(s) reduces scheduling inefficiencies typically associated with prior art scheduling techniques. In particular, the disclosed techniques may be used to continually update a scheduled sequence of events that serves as an agenda for a meeting. During the meeting, the agenda may be displayed to increase awareness of the progression of the meeting and to decrease distractions attributable to manually tracking and managing the meeting time. These technical advantages provide a substantial technological advancement over prior art solutions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 illustrates an example delegation email sent by the setup engine of FIG. 1 to an associated delegate, according to various embodiments of the present invention;

FIGS. 3A-3C illustrate examples of the scheduling graphical user interface (GUI) of FIG. 1 at three different points in time during a meeting, according to various embodiments of the present invention.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
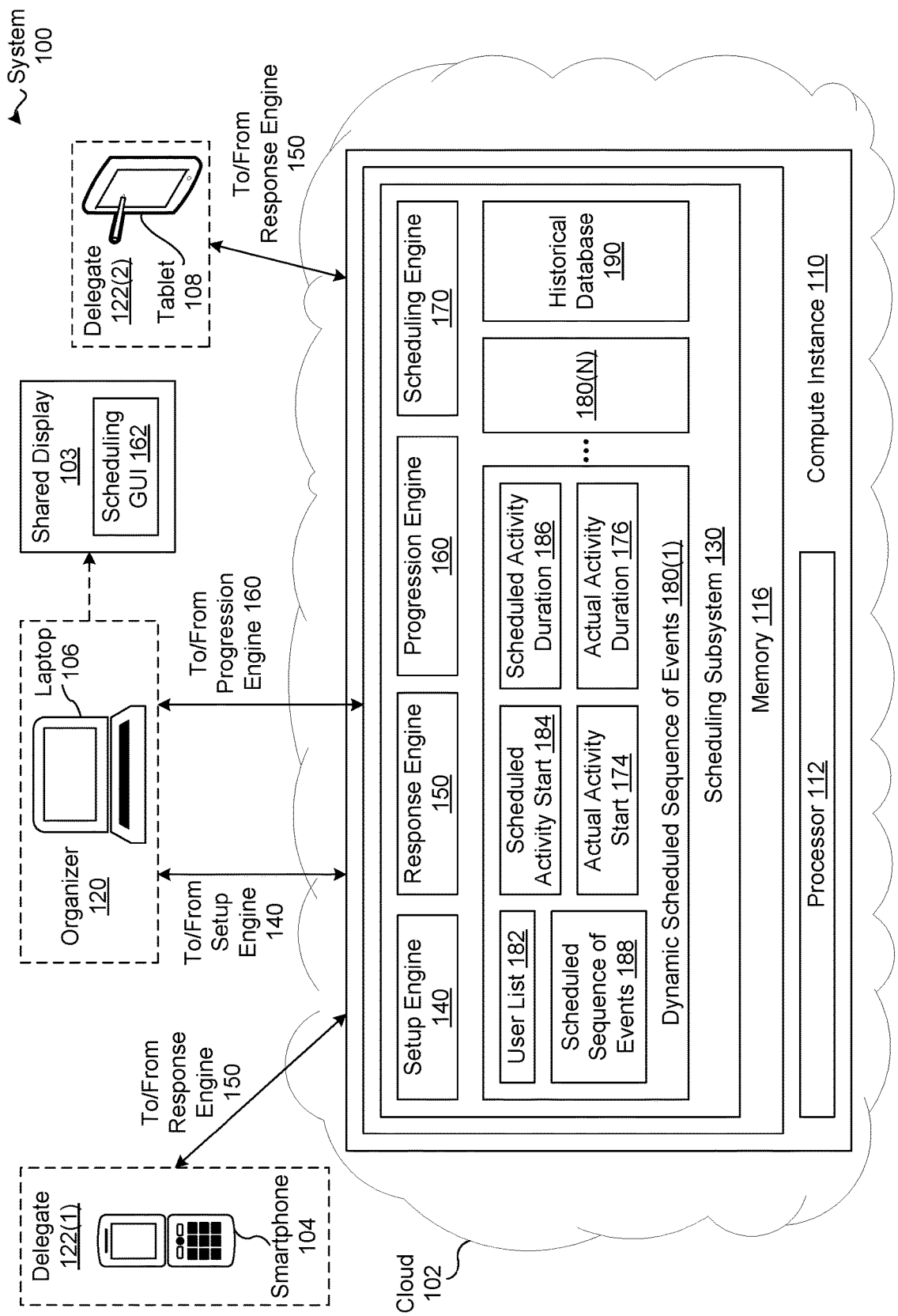
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a cloud 102 connected to a variety of devices capable of transmitting input data and/or displaying video. Such devices include, without limitation, a smartphone 104, a laptop 106, and a tablet 108. In alternate embodiments, the system 100 may include any number and/or type of input, output, and/or input/output devices in any combination. In general, the cloud 102 contains encapsulated shared resources, software, data, etc. For explanatory purposes, multiple instances of like objects are denoted with reference numbers identifying the object and parenthetical numbers identifying the instance where needed.

In various embodiments, any number of the components of the system 100 may be distributed across multiple geographic locations. Further, any number of the components of the system 100 may be included in or distributed across one or more stand-alone devices, distributed computing environments, or clouds 102 in any combination. Any number of compute instances 110 may reside inside the cloud 102 while other compute instances 110 may reside outside the cloud 102. For instance, although not shown, each of the smartphone 104, the laptop 106, and the tablet 108 includes a different computer instance 110.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications and/or one or more subsystems of applications. For explanatory purposes only, each application and each subsystem is depicted as residing in the memory 116 of a single compute instance 110 and executing on a processor 112 of the single compute instance 110. However, as persons skilled in the art will recognize, the functionality of each application and subsystem may be distributed across any number of other subsystems and/or applications that reside in the memories 116 of any number of compute instances 110 and execute on the processors 112 of any number of compute instances 110 in any combination. Further, the functionality of any number of subsystems and/or applications may be consolidated into a single application or subsystem.

In general, the system 100 is configured to facilitate scheduled activities between any number of users. For each scheduled activity, one of the users is also an organizer 120. Any number of the users may be associated with any number of devices that are connected to the cloud 102. In particular, and as depicted in FIG. 1, the system 100 facilitates meetings between any number of users (i.e., attendees). Each of the users may attend the meeting remotely via a device that is connected to the cloud 102, or may attend the meeting at a designated meeting location (e.g., a conference room). To facilitate participation in the meeting at a designated meeting location, the organizer 120 connects the laptop 106 to a shared display 103 during the meeting.

In conventional approaches to scheduling and conducting meetings, organizers oftentimes attempt to organize and conduct effective meetings based on manually-generated agendas. To generate such an agenda, the organizer allocates a different portion of the meeting time to each agenda item that is to be addressed during the meeting. Examples of agenda items include updates, presentations, and demonstrations, to name a few. The organizer then reserves any required meeting resources (e.g., conference room, projector, etc.), and emails meeting invitations. During the meeting, the organizer attempts to structure the interactions of the attendees based on the overarching agenda(s) for that meeting.

One drawback of the above approach is that timing the linearly dependent agenda items is challenging and often leads to meeting inefficiencies. For example, the organizer could allocate five minutes for a status update from a particular attendee without realizing that the attendee wishes to discuss a design decision, which can take far longer than five minutes. During the meeting, the attendee could disregard the agenda and continue to solicit feedback on the design decision past the time allotted for his/her status update. As a result, other, potentially more important, agenda items may not be addressed during the meeting and other attendees may become frustrated with the meeting and/or disengaged from the meeting.

If the organizer is manually tracking and managing the meeting time, then the organizer can interrupt meeting participants as they speak in the meeting in an attempt to reduce discrepancies between the actual durations and scheduled durations of the agenda items for the meeting. For example, if the actual duration of an agenda item were to exceed the scheduled duration of the agenda item by more than five minutes, then the organizer could draw the attention of the attendees to the current time and proceed to address the next agenda item. However, manually tracking agenda items and managing the overall meeting process in such a fashion is distracting to the organizer and reduces the ability of the organizer to benefit from and contribute to the meeting.

Crowdsourcing and Automatically Updating Schedules

To address the above problems, the system 100 includes, without limitation, a scheduling subsystem 130. As shown, the scheduling subsystem 130 includes, without limitation, any number of dynamic scheduled sequences of events 180 (such as 180(1) through 180(N)), a historical database 190, a setup engine 140, a response engine 150, a progression engine 160, and a scheduling engine 170. In general, the dynamic scheduled sequence of events 180 describes a group of events that are linearly dependent and associated with a common timeline-based activity. The scheduling subsystem 130 automatically generates and automatically adapts the dynamic scheduled sequence of events 180 in real-time based on the actual progression of the activity associated with the dynamic scheduled sequence of events 180 and user input.

Each of the dynamic scheduled sequences of events 180 may be associated with a different type of timeline-based activity. For instance, in some embodiments, the dynamic scheduled sequence of events 180 is a dynamic agenda for a group meeting. In the same or other embodiments, the dynamic scheduled sequence of events 180 is a "dynamic" Gantt chart that tracks the progress of a construction project. As shown for the dynamic scheduled sequence of events 180(1), each of the dynamic scheduled sequences of events 180 includes, without limitation, a user list 182, a scheduled activity start 184, a scheduled activity duration 186, a scheduled sequence of events 188, an actual activity start 174, and an actual activity duration 176. The user list 182 specifies any number of users that are associated with the dynamic scheduled sequence of events 180 in any technically feasible fashion. For instance, in some embodiments, the user list 182 specifies the email addresses of any number of users that are to be invited to a meeting.

The scheduled activity start 184 is the scheduled start of the activity associated with the dynamic scheduled sequence of events 180. The scheduled activity duration 186 is the scheduled length of the activity associated with the dynamic scheduled sequence of events 180. A scheduled activity completion, not shown, is equal to the sum of the scheduled activity start 184 and the scheduled activity duration 186. In a complementary fashion, the actual activity start 174 is the actual start of the activity associated with the dynamic scheduled sequence of events 180. The actual activity duration 176 is the actual duration of the activity associated with the dynamic scheduled sequence of events 180.

The scheduled sequence of events 188 includes, without limitation, any number of linearly dependently events that are ordered based on the timeline of the activity associated with the dynamic scheduled sequence of events 180. For example, if the activity is a meeting, then the scheduled sequence of events 188 could be an ordered list of agenda items that spans the meeting time. In another example, if the activity is a project, then the scheduled sequence of events 188 could be an ordered list of project deliverables, project milestones, project activities, and the like. The scheduled sequence of events 188 may also be referred to herein as a "schedule."

Notably, each event has dependencies on the completion of each of the preceding events included in the scheduled sequence of events 188. Although not shown, each of the events is associated with a scheduled start (time), a scheduled duration, an actual start (time), an actual duration, and an owner. As a general matter, a scheduled completion (time) is equal to the sum of the scheduled start and the scheduled duration. Similarly, an actual completion (time) is equal to the sum of the actual start and the actual duration. The owner is a user included in the user list 182 and is responsible for the event. Each of the events may also be associated with any amount of additional information that may or may not be activity-specific. For instance, in some embodiments, each of the events is also associated with a title and any number of required resources (e.g., a projector).

For explanatory purposes, any time-related property of the dynamic scheduled sequence of events 180 or an event is referred to herein as a "temporal property." Examples of temporal properties include, without limitation, starts, completions, durations, delays, and the like. In alternate embodiments, the dynamic scheduled sequence of events 180 may be associated with any number of temporal properties that define a scheduled span of time for the meeting instead of or in addition to the scheduled start 184 and the scheduled duration 186. For instance, the dynamic scheduled sequence of events 180 may include a scheduled completion instead of the scheduled duration 186. Similarly, each of the events may be associated with any number of temporal properties that define a scheduled span of time for the event.

In various embodiments, the dynamic scheduled sequence of events 180 may include any amount and type of additional information that may or may not be specific to the type of the associated activity. For instance, if the dynamic scheduled sequence of events 180 is associated with a meeting, then the dynamic scheduled sequence of events 180 may also include a parameter that indicates whether or not the dynamic scheduled sequence of events 180 represents a recurring meeting.

The historical database 190 includes, without limitation, any amount and type of information that describes characteristics of completed activities, events associated with the completed activities, and/or any number of users associated with the completed activities. Accordingly, the historical database 190 facilitates the identification of recurring patterns associated with different activities, events, and/or users. The historical database 190 may be organized, stored, and accessed in any technically feasible fashion based on any criteria.

For instance, in some embodiments, the historical database 190 includes a meeting history for each meeting that is associated with a dynamic scheduled sequence of events 180. The meeting history includes, without limitation, the values at the completion of the meeting for the scheduled activity start 184, the scheduled activity duration 186, the actual activity start 174, and the actual activity duration 176. In the same or other embodiments, the historical database also includes any number of temporal properties and any number of configuration properties associated with each of the events. Examples of configuration parameters associated with an event include the originally requested duration for the event, the user that owns (i.e., is responsible for) the event, and so forth.

In operation, the setup engine 140 interacts with the organizer 120 to initialize a new dynamic scheduled sequence of events 180. The organizer 120 it a user that owns the dynamic scheduled sequence of events 180. The setup engine 140 may interact with the organizer 120 in any technically feasible fashion. For instance, in some embodiments, the setup engine 140 is a web application associated with a uniform record locator (URL) that is known to the organizer 120. Accordingly, the organizer 120 interacts with the setup engine 140 via one or more webpages.

To initialize the dynamic scheduled sequence of events 180, the setup engine 140 acquires the user list 182, the scheduled activity start 184, the scheduled activity duration 186, and a list of any number of events that are to be included in the scheduled sequence of events 188. Each of the events is either a static event or a delegated event. Each static event is associated with a topic, a scheduled duration, and the user that owns the static event. For example, a static event could be a 15 minute "New Bug Tracking System Demo" owned by a user "John" or a 60 minute "Lunch Break" owned by the organizer 120.

Each delegated event is associated with an owner. The owner of a delegated event is also referred to herein as a delegate 122 (such as 122(1) and 122(2)). For each of the delegated events, the setup engine 140 requests additional information from the associated delegate 122. The setup engine 140 may request the additional information in any technically feasible fashion and at any time. For instance, in some embodiments, and as described in greater detail in conjunction with FIG. 2, for each of the delegated events, the setup engine 140 sends a delegation email to the associated delegate 122. The delegation email includes one or more links to the response engine 150, where each link includes different parameter(s). The setup engine 140 may send the delegation emails immediately or at a specified length of time (e.g., two weeks) before the scheduled activity start 184.

In some embodiments, instead of acquiring/requesting a scheduled duration for a given static event or a given delegated event, the setup engine 140 acquires/requests a duration range. For instance, in some embodiments, the owner may specify that a given event has a "short," "medium," or "long," duration range. The setup engine 140 may define the duration ranges in any technically feasible fashion based on any criteria. For example, events associated with short duration ranges could be expected to require no longer than five minutes, events associated with medium duration ranges could be expected to require no more than ten minutes, and events associated with long duration ranges could be expected to require no more than twenty minutes.

The setup engine 140 interacts with the scheduling engine 170 to initialize the scheduled sequence of events 188 based on the events. In general, the scheduling engine 170 arranges the events in a linear, contiguous, and non-overlapping fashion along the timeline defined by the scheduled activity start 184 and the scheduled activity duration 186. The scheduling engine 170 may implement any number and type of scheduling algorithms to arrange the events within the scheduled sequence of events 188. Some scheduling algorithms may be influenced by additional information that the setup engine 140 acquires from the organizer 120. In general, the setup engine 140 may be configured to acquire any amount of additional information that is relevant to the scheduling engine 170 in any technically feasible fashion. The scheduling engine 170 is described in greater detail below.

The response engine 150 acquires information from the delegates 122 and interacts with the scheduling engine 170 to update the scheduled sequence of events 188 based on the acquired information. The response engine 150 may acquire information from the delegates 122 in any manner that is consistent with the setup engine 140. For instance, in some embodiments and as described in greater detail in conjunction with FIG. 2, the response engine 150 is a web application that is associated with one or more parameters. For each of the delegated events, the setup engine 140 sends a delegation email to the associated delegate 122. The delegation email includes any number of links to the response engine 150, where each link includes different values for the parameters.

In some embodiments, one of the links rejects the delegated event, while each of the other links is associated with a different duration range. Upon clicking one of the links, the response engine 150 interacts with the delegate 122 via a webpage corresponding to the clicked link. The webpage confirms the selected duration range and/or allows the delegate 122 to specify any amount and type of additional information that is relevant to the delegated event. Examples of additional information include, without limitation, the title of the delegated event, equipment required for the delegated event, additional information regarding the scheduling of the delegated event, and so forth.

The progression engine 160 modifies the dynamic scheduled sequence of events 180 in real-time based on the current time, the progression of the associated activity, and interactions with the users included in the user list 182. Further, the progression engine 160 provides a scheduling graphical interface (GUI) 162. The scheduling GUI 162 depicts, without limitation, the current time with respect to the scheduled sequence of events 188. The scheduling GUI 162 may also provide any number and type of visual components that enable users to quickly and efficiently modify the dynamic scheduled sequence of events 180 before or during the associated activity. Examples of visual components include, without limitation, interface widgets, selection mechanisms, etc.

For instance, in some embodiments, the scheduling GUI 162 may provide visual components that enable the organizer 120 to modify properties of the dynamic scheduled sequence of events 180, the scheduled sequence of events 188 and the events. For example, the scheduling GUI 162 could enable the organizer 120 to modify the title of the activity, the user list 182, the scheduled activity start 184, and the scheduled activity duration 186. In the same or other embodiments, the scheduling GUI 162 may provide widgets that enable the organizer 120 and each of the delegates 122 to modify any properties of their delegated event. Notably, if the progression engine 160 receives input via the scheduling GUI 162 that impacts the scheduled sequence of events 188, then the progression engine 160 interacts with the scheduling engine 170 to update the scheduled sequence of events 188. Subsequently, the progression engine 160 updates the scheduling GUI 162 to visually depict the updated scheduled sequence of events 188.

When the current time is equal to the scheduled activity start 188, the progression engine 160 begins to track the progression of the associated activity. For example, if the dynamic scheduled sequence of events 180 is an agenda for a meeting, then the progression engine 160 begins to track the progression of the meeting. The progression engine 160 tracks the progression of the meeting via a current time and a current event. Until the activity associated with the dynamic scheduled sequence of events 180 is completed, the progression engine 160 dynamically configures the scheduling GUI 162 to indicate the current time, the current event, the currently scheduled durations of each of the events, and the actual durations of completed events.

The progression engine 160 may configure the scheduling GUI 162 to indicate the current time, the current event, the currently scheduled durations of each of the events, and the actual durations of completed events in any technically feasible fashion. For instance, in some embodiments, the progression engine 160 configures the scheduling GUI 162 to indicate the current time via two current time markers (not shown in FIG. 1). Each of the current time markers is located on a different side of the depicted scheduled sequence of events 188 at a vertical location that corresponds to the current time. The progression engine 160 updates the current time markers automatically based on the current time.

Importantly, the progression of the current time markers is independent of the progression of the activity associated with the dynamic scheduled sequence of events 180. Advantageously, representing the current time independently of the progression of the activity enables users to easily comprehend the actual progression of the activity versus the scheduled progression of the activity. In various embodiments, the progression engine 160 may be configured to update the scheduling GUI 162 based on the current time continually or periodically (e.g., every minute).

The progression engine 160 assigns the current event based on user input received via the scheduling GUI 162. For instance, in some embodiments, the organizer 120 clicks a "start" button to indicate that the activity has actually started. In response to the start button, the progression engine 160 sets the actual activity start 174 equal to the current time. In addition, the progression engine 160 sets the current event equal to the first event included in the scheduled sequence of events 188. Subsequently, the organizer 120 clicks a "next" button to indicate that the activity has advanced to the next event included in the scheduled sequence of events 188. In response to the next button, the progression engine 160 sets the current event equal to the next event included in the scheduled sequence of events 188. In other embodiments, the organizer 120 selects the depiction of an event in the scheduling GUI 162 to indicate that the selected event is in progress. In response, the progression engine 160 sets the current event equal to the selected event.

Immediately prior to updating the current event, the progression engine 160 computes (and stores) the actual duration associated with the current event based on the current time and the actual start associated with the current event. Immediately after updating the current event, the progression engine 160 sets (and stores) the actual start associated with the current event based on the current time. Consequently, at any given time, the progression engine 160 ensures that each of the completed events is associated with an accurate actual start and an actual duration.

Further, after the progression engine 160 computes the actual duration of an event, the progression engine 160 determines whether the actual duration of the event is less than the scheduled duration of the event. If the progression engine 160 determines that the actual duration of the event is less than the scheduled duration of the event, then the progression engine 160 computes a current slack. The progression engine 160 computes the current slack as the difference between the scheduled duration of the event and the actual duration of the event.

The progression engine 160 then interacts with the scheduling engine 170 to update the dynamic scheduled sequence of events 180 based on the current slack. As part of automatically updating the dynamic scheduled sequence of events 180, the scheduling engine 170 dynamically adapts the scheduled sequence of events 188 to distribute the current slack among the remaining events and/or reduce the scheduled activity duration 186. The progression engine 160 then configures the scheduling GUI 162 to display the updated scheduled sequence of events 188 along with visual indication(s) that the completion of the current event occurred ahead of schedule, and the length of the current slack.

In a complementary fashion, the progression engine 160 monitors the current event with respect to the current time to detect if the completion of the current event is overdue based on the current time. The progression engine 160 may detect that the completion of the current event is overdue in any technically feasible fashion. For instance, in some embodiments, the progression engine 180 computes the scheduled completion of the current event as the sum of the actual start of the current event and the scheduled duration 186 of the current event. Subsequently, the progression engine compares the current time to the scheduled completion of the current event. If the current time is later than the scheduled completion of the current event, then the progression engine 180 determines that the completion of the current event is overdue. Further, the progression engine 160 computes a current delay as the difference between the current time and the scheduled completion of the current event.

If the progression engine 160 detects that the completion of the current event is overdue, then the progression engine 160 updates the scheduled sequence of events 188 and the scheduling GUI 162. More specifically, the progression engine 160 interacts with the scheduling engine 170 to generate an updated scheduled sequence of events 188 based on the current delay. As part of generating the updated scheduled sequence of events 188, the scheduling engine 160 modifies the temporal properties of any number of the subsequent events and/or the temporal properties of the dynamic scheduled sequence of events 180. Modifying the temporal properties of an event reschedules the event. The progression engine 160 then configures the scheduling GUI 162 to display the updated scheduled sequence of events 188 along with visual indication(s) that the completion of the current event is overdue and the length of the current delay.

To track whether the activity associated with the scheduled sequence of events 188 starts as scheduled, the progression engine 160 automatically generates a "start" event corresponding to scheduled activity start 184. The start event precedes the first event included in the scheduled sequence of events 188. Prior to the scheduled activity start 184, the progression engine 160 sets the scheduled start associated with the start event equal to the scheduled activity start 184 and the scheduled duration associated with the start event equal to 0. Further, the progression engine 160 sets the current event equal to the start event and the actual start associated with the start event equal to the scheduled activity start 184. By initializing the current event to the start event in this fashion, the progression engine 160 tracks the start event as if the start event were one of the events. In alternate embodiments, the dynamic engine 180 may track whether the activity associated with the dynamic scheduled sequence of events 180 starts as scheduled in any technically feasible fashion.

After the final event has completed, the progression engine 160 computes the actual activity duration 176 based on the actual activity start 174 and the current time. The progression engine 160 then stores any number of temporal properties associated with the activity and/or any number of the events in the historical database 190. In some embodiments, the progression engine 160 may also compute a total cost associated with the activity based on an estimated cost of each of the users included in the user list 182, the actual duration of the activity and, optionally, the start delay associated with the activity. The progression engine 160 may provide the cost information to any number of users in any technically feasible fashion. For instance, the progression engine 160 could email to total cost to the organizer 120. In alternate embodiments, at any point in time, the progression engine 160 may compute and provide an estimated total cost in any technically feasible fashion.

Advantageously, if the activity associated with the dynamic scheduled sequence of events 180 is a meeting, then the organizer 120 can display the scheduling GUI 162 via the shared display 103 during the meeting. Displaying the scheduling GUI 162 in this fashion cultivates awareness of the current progression of the meeting among the attendees, enabling the attendees to adjust behaviors and/or the timing of their events in an informed fashion. For example, if the completion of the current event is overdue, then the delegate 122 that owns a subsequent event could interface with a local instance of the scheduled GUI 162 to reduce the scheduled duration 186 of their delegated event. Illustrations of the scheduling GUI 162 associated with a meeting are described in greater detail in conjunction with FIGS. 3A-3C.

In some embodiments, to further influence the progression of the activity, the progression engine 160 may modify the scheduling GUI 162 based on the historical database 190. For instance, suppose that the historical database 190 indicates that the owner of a particular event has routinely exceeded the scheduled durations associated with their completed events. In some embodiments, the progression engine 190 may visually compress the representation of the event in the scheduling GUI 162 to encourage the owner to complete the event in a more expedited fashion. For example, if the scheduled duration was 10 minutes, then the progression engine 190 could modify the representation of the event to correspond to a scheduled duration of 9 minutes and expand the appearance of subsequent events accordingly.

The scheduling engine 170 generates and automatically updates the scheduled sequence of events 188 based on data received from the setup engine 140, the response engine 150, and the progression engine 160. The scheduling engine 170 may perform any amount and type of scheduling operations based on any type and amount of data in any technically feasible fashion. In particular, the scheduling engine 170 may perform scheduling operations based, in part, on information included in the historical database 190

Scheduling operations include, without limitation, ordering the events within the scheduled sequence of events 188; assigning and updating the scheduled activity start 184, the scheduled activity duration 186; and assigning and updating the scheduled durations and scheduled starts of each event. In some embodiments, scheduling operations may also include activities associated with any required resources (e.g., reserving a conference room, reserving equipment, ordering food, etc.).

In some embodiments, the organizer 120 specifies the scheduled activity start 184 and the scheduled activity duration 186 via the setup engine 140. In alternate embodiments, the organizer specifies the scheduled activity duration 186 and any required resources via the setup engine 140, and the scheduling engine 170 selects the scheduled activity start 184 based on the available of required resources. Examples of required resources include, without limitation, the available of the users included in the user list 182, the availability of conference rooms, the availability of equipment, etc.

In some embodiments, the organizer 120 specifies the order of each of the events within the scheduled sequence of events 188. In other embodiments, the scheduling engine 170 orders the events within the scheduled sequence of events 188 based on any number (including zero) of ordering constraints. The scheduling engine 170 may acquire the ordering constraints in any technically feasible fashion. For instance, in some embodiments, the setup engine 140 provide ordering constraints acquired from the organizer 120 and/or the response engine 150 provides ordering constraints acquired from any number of the delegates 122.

Some examples of ordering constraints include, without limitation, priorities associated with any number of event, ordering dependencies between any number of events, availability of the owner of an event, and so forth. For example, if an ordering constraint specifies that the event A is to occur sometime before the event B, then the scheduling engine 170 ensures that the event A occurs before the event B within the scheduled sequence of events 188.

In general, the scheduling engine 170 may order and re-order events in any technically feasible fashion based on any number and combination of ordering algorithms subject to any number and type of ordering constraints. For example, one ordering algorithm could order events based on duration or duration range. Another ordering algorithm could optimize the order of events based on a common resource (e.g., a projector). For instance, in some embodiments, the scheduling engine 170 may attempt to alternate between events that require a particular resource and events that do not require the resource. As a result, the scheduling engine 170 optimizes any delays associated with transitioning the resource, Yet another ordering algorithm could order events based on the historical database 190. For instance, in some embodiments, the scheduling engine 170 may identify events associated with users that routinely exceeded the scheduled durations associated with their completed events. The scheduling engine 170 may then assign the identified events to positions relatively late within the scheduled sequence of events 188 to reduce the impact of the identified events on other events.

In some embodiments, for each event, the organizer 120 or the associated delegate 122 specifies the associated scheduled duration or an associated duration range. The scheduling engine 170 computes the total requested duration range based on the scheduled durations and the durations ranges associated with the various events. If the minimum total requested duration range does not exceed the scheduled activity duration 186, then the scheduling engine 170 assigns the scheduled durations for any events associated with a duration range based on the scheduled activity duration 186.

If however, the minimum total requested duration range exceeds the actual activity duration 176, then for each event associated with a duration range, the scheduling engine 170 sets the scheduled duration to the minimum of the duration range. The scheduling engine 170 then compresses the events proportionally based on the discrepancy between the minimum total requested duration range and the scheduled activity duration 186. For example, suppose that scheduled activity duration 186 is 90 minutes and the minimum total requested duration range 100. For each of the events, the scheduling engine 170 could multiply the scheduled duration by a compression factor or 0.9 and adjust the scheduled start based on the adjustments to any preceding events.

In alternate embodiments, the scheduling engine 170 may adjust the scheduled activity duration 186 as part of assigning scheduled starts and scheduled durations to the events. For instance, if the maximum total duration is less than the scheduled activity duration 186, then the scheduling engine 170 could decrease the scheduled activity duration 186. If, however, the minimum total duration exceeds the scheduled activity duration 186, then the scheduling engine 170 could increase the scheduled activity duration 186 instead of or in addition to compressing any number of the events. In some embodiments, the scheduling engine 170 may selectively increase the scheduled activity duration 186 based on the availability of any required resources, including the required users.

In some embodiments, the scheduling engine 170 selects and/or adjusts any number of the temporal properties of an event based on the historical database 190. For example, the scheduling engine 170 could identify events associated with users that routinely exceeded the scheduled durations associated with their completed events. For each of the identified events that is associated with a scheduled duration, the scheduling engine 170 could preferentially set the scheduled duration to the maximum value associated with the duration range. In general, while the activity is in progress, the scheduling engine 170 continues to update the dynamic scheduled sequence of events 180 and the scheduled sequence of events 188 based on user input.

Importantly, while the activity is in progress and upon receiving notification of a timing discrepancy from the progression engine 160, the scheduling engine 170 updates the dynamic scheduled sequence of events 180 based on the timing discrepancy. As referred to herein, a timing discrepancy is a current delay or a current slack. As part of updating the dynamic scheduled sequence of events 180, the scheduling engine 170 may update any number and combination of the temporal properties associated with the activity and/or any number and combination of the temporal properties associated with any number of uncompleted events.

In some embodiments, the scheduling engine 170 attempts to distribute a timing discrepancy equitably between the uncompleted events. For instance, in some embodiments, the scheduling engine 170 could compute a compression factor based on the current time, the scheduled activity completion, and the current delay. For each uncompleted event, the scheduling engine 170 could update the scheduled duration based on the compression factor and the scheduled duration of the event. Subsequently, the scheduling engine 170 could sequentially updated the scheduled start associated with each of the uncompleted events based on the updated scheduled start and the updated scheduled duration associated with the immediately preceding event.

For example, suppose that the current delay is 9 minutes, the scheduled sequence of events 188 includes two uncompleted events A and B, the event A is associated with a scheduled duration of 10 minutes, and the event B is associated with a scheduled duration of 20 minutes. The scheduling engine 170 could compute a contraction factor of 0.7. Accordingly, the scheduling engine 170 could adjust the scheduled duration of the event A to 7 minutes and the scheduled duration of the event B to 14 minutes. Subsequently, the scheduling engine 170 could add 9 minutes to the scheduled start associated with the event A and 6 minutes to the scheduled start associated with the event B.

In alternate embodiments, the scheduling engine 170 may attempt to distribute the timing discrepancy among events that are associated with duration ranges before adjusting events that are not associated with duration ranges. In the same or other embodiments, the scheduling engine 170 may adjust the scheduled activity duration 186 as part of redistributing the timing discrepancy. In some alternate embodiments, the scheduling engine 170 may adapt the scheduled sequence of events 188 based on the timing discrepancy and any number of scheduling properties associated with the events.

For instance, in some embodiments, the setup engine 140 may enable the organizer 120 to designate a static event as a "buffer" event having a flexible duration. If the scheduled sequence of events 188 includes a buffer event, then the scheduling engine 170 may modify the buffer event based on a timing discrepancy instead of or in addition to modifying any of the other events. For example, suppose that the current delay is 9 minutes, the scheduled sequence of events 188 includes the uncompleted event A that is associated with a scheduled duration of 10 minutes and the buffer event that is associated with a scheduled duration of 20 minutes. The scheduling engine 170 could add the current delay of 9 minutes to the scheduled start associated with the event A and leave the scheduled duration associated with the event A unchanged. The scheduling engine 170 could reduce the scheduled duration of the buffer event from 20 minutes to 11 minutes.

In the same or other embodiments, the setup engine 140 may enable the organizer 120 to specify any number of static events as "break" events. The break events partition the scheduled sequence of events 188 into subsequences for the purposes of scheduling. At any given current time, one of the subsequences is active. Upon receiving notification of a timing discrepancy from the progression engine 160, the scheduling engine 170 adjusts the active subsequence based on the timing discrepancy and does not adjust any of the other subsequences.

Note that the techniques described herein are illustrative rather than restrictive, and may be altered without departing from the broader spirit and scope of the invention. Many modifications and variations on the functionality provided by the scheduling subsystem 130 the setup engine 140, the response engine 150, the progression engine 160, and the scheduling engine 170 will be apparent to those of ordinary skill in the art without departing from the scope and spirit of the described embodiments.

It will be appreciated that the system 100 shown herein is illustrative and that variations and modifications are possible. For example the functionality provided by the scheduling subsystem 130 the setup engine 140, the response engine 150, the progression engine 160, and the scheduling engine 170 as described herein may be integrated into or distributed across any number of software applications (including one) and any number of components of the system 100. Further, the connection topology between the various units in FIG. 1 may be modified as desired.

FIG. 2 illustrates an example delegation email 210 sent by the setup engine 140 of FIG. 1 to an associated delegate 122, according to various embodiments of the present invention. As shown, the setup engine 140 sends the delegation email 210 to the delegate 122 "Mike" on behalf of the organizer 120 "Rahul." The delegation email 210 includes, without limitation, four links. Each link specifies the value "Mike" for a delegate parameter and a different value for a length parameter.

The first link is short response link that is associated with a short (1-5 minute) duration range and specifies a value of "s" for the length parameter. The second link is a medium response link that is associated with a medium (5-10 minute) duration range and specifies a value of "m" for the length parameter. The third link is a long response link 220 that is associated with a long (10-20 minute) duration range and specifies a value of "l" for the length parameter. The fourth link is a reject response link that is associated with a rejection of the delegated event and specifies a value of "r" for the length parameter.

Upon following (e.g., clicking) one of the response links, the response engine 150 interacts with the delegate 122 via a webpage corresponding to the response link. The webpage confirms the selected duration range and/or allows the delegate 122 to specify any amount and type of additional information that is relevant to the delegated event. Examples of additional information include, without limitation, the title of the delegated event, equipment required for the delegated event, additional information regarding the scheduling of the delegated event, and so forth.

Each of the response links may involve a different amount of interaction with the delegate 122. For instance, in some embodiments, following the short response link displays a webpage acknowledging the short duration range of the delegated event and involves no further interaction with the delegate 122. Similarly, following the reject response link displays a webpage acknowledging the rejection of the delegated event and involves no further interaction with the delegate 122. By contrast, following the medium response link displays a webpage that requests a title for the delegated event.

As shown, following the long response link 220 displays a long response webpage that requests a title for the delegated event and allows the delegate 122 "Mike" to specify whether a projector is required for the delegated event. After the delegate 122 "Mike" indicates the requested information, the delegate 122 "Mike" clicks "select," and the response engine 150 updates the delegated event and the scheduled sequence of events 188.

In alternate embodiments, the setup engine 140, the response engine 150, and the progression engine 160 may obtain any amount of information from any number of users in any technically feasible fashion. For instance, in some embodiments, the response engine 150 may process any electronically-communicated response to the delegation email 210 in any technically feasible fashion. In other embodiments, the setup engine 140 does not send emails. Instead, each of the delegates 122 interacts with the response engine 150 via the scheduling GUI 162.

Automatically Adapting an Agenda During a Meeting

FIGS. 3A-3C illustrate examples of the scheduling graphical user interface (GUI) 162 of FIG. 1 at three different points in time during a meeting, according to various embodiments of the present invention. Accordingly, the activity associated with the dynamic scheduled sequence of events 180 is a meeting, and the scheduled sequence of events 188 depicted via the agenda GUI 192 is the agenda of the meeting.

FIG. 3A depicts the scheduling GUI 162 when the current time is equal to the scheduled activity start 184. As shown, the progression engine 160 arranges the events included in the scheduled sequence of events 188 to define a vertical timeline that spans the scheduled activity duration 184 of 60 minutes. The progression engine 160 depicts the current time with respect to the scheduled activity duration 186 via two current time markers 320. In addition, the progression engine 160 displays the scheduled duration of each of the events.

Until the progression engine 160 receives user input via the scheduling GUI 162 that the first event is in progress, the progression engine 160 periodically updates the dynamic scheduled sequence of events 180 based on the current time. More specifically, the progression engine 160 computes a current delay between the current time and the scheduled activity start 184. The progression engine 160 configures the scheduling engine 170 to update the dynamic scheduled sequence of events 180 based on the current delay. Notably, the progression engine 160 compresses the scheduled duration and adjusts the scheduled start time associated with each of the events based on the current delay. Subsequently, the progression engine 160 updates the scheduling GUI 162 to depict the current time, the current time, and the current delay.

Six minutes after the scheduled activity start 184, the progression engine 160 receives user input via the scheduling GUI 162 that the first event is in progress. In response, as depicted in FIG. 3B, the progression engine 160 sets the actual activity start 174 equal to the current time, sets the current event to the first event, and updates the scheduling GUI 162 to highlight the first event. Because the start of the meeting was delayed by 6 minutes, the scheduling GUI 162 includes a shaded area labeled "OVER Start (6)" that spans 6 minutes. Notably, for each of the events, the scheduled duration depicted in FIG. 3B is less than scheduled duration in FIG. 3A. Similarly, for each of the events, the scheduled start depicted in FIG. 3B is later than the scheduled start depicted in FIG. 3A. For example, each of Joel, Nicole, Justin, and Tehura own an event for which the progression engine 160 compressed the scheduled duration from 5 minutes at the scheduled activity start 184 to 4.5 minutes at the actual activity start 174.

As depicted via the current time markers 320, FIG. 3C depicts the scheduling GUI 162 at 24 minutes after the scheduled activity start 184. As shown, the event associated with Joel was completed as per the revised scheduled duration of 4.5 minutes shown in FIG. 3B. However, the event "Demo: XYZ Application" associated with Rahul has exceeded the scheduled duration of 9 minutes depicted in FIG. 3B by 4.5 minutes. Accordingly, the scheduling GUI 162 includes a shaded area labeled "OVER Demo: XYZ Application (4.5)" that spans 4.5 minutes Further, the progression engine 160 has distributed the current delay of 4.5 minutes between the subsequent events and updated the scheduling GUI 162 based on the updated scheduled sequence of events 188. For example, each of Nicole, Justin, and Tehura own an event for which the progression engine 160 compressed the scheduled duration from 4.5 minutes at the actual activity start 174 to 4 minutes at 12 minutes after the scheduled activity start 184.

As illustrated by FIGS. 3A-4C, the progression engine 160 automatically updates the events based on time discrepancies without requiring additional input from the organizer 122. Further, displaying the scheduling GUI 162 cultivates awareness of the current progression of the meeting among the attendees. The scheduling GUI 162 provides visual notification of any changes to the scheduled duration of the events. In addition the scheduling GUI 162 provides immediate feedback indicating the impact of exceeding the scheduled duration associated with an event on subsequent events.

Figure 4:
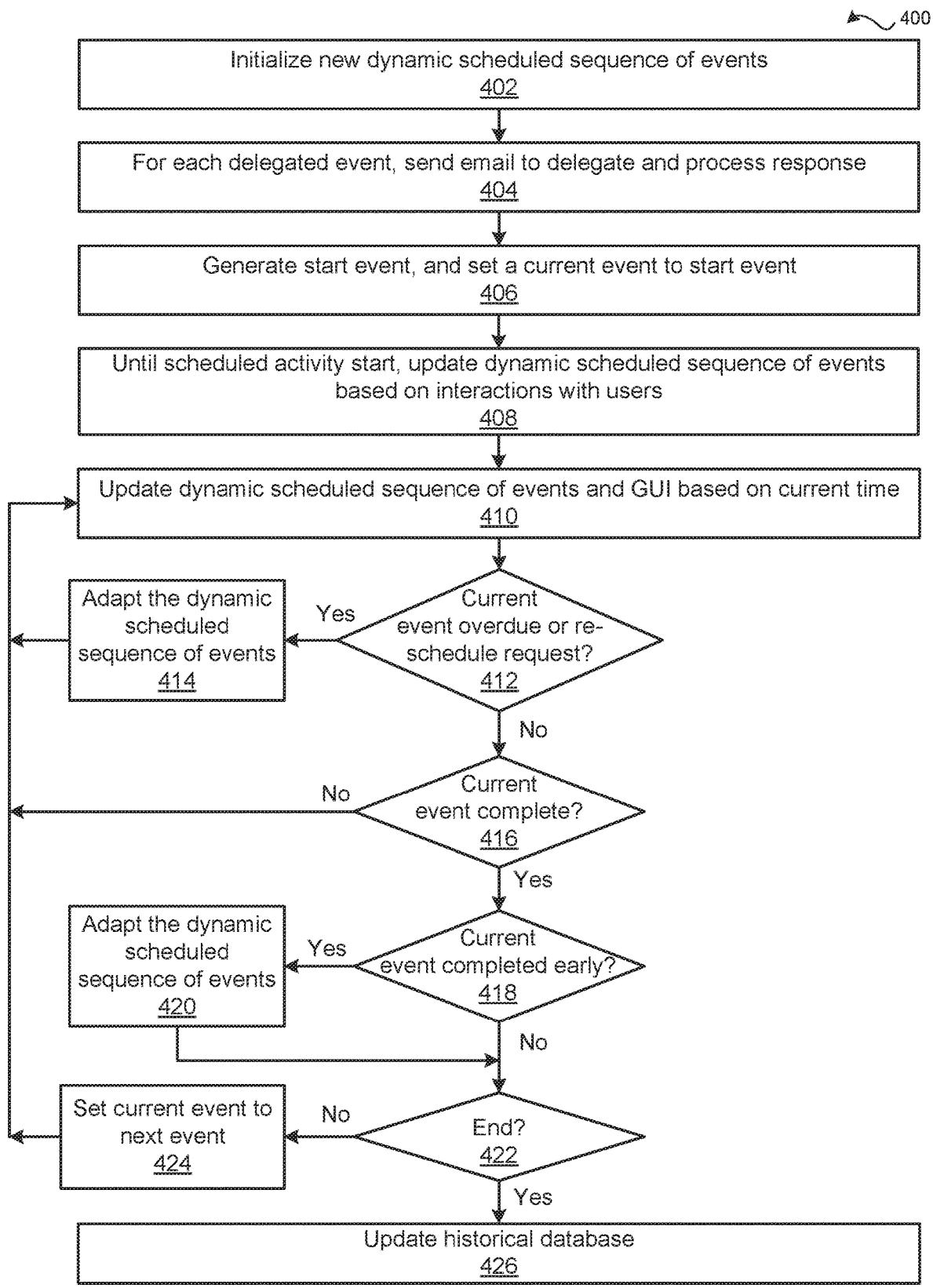
FIG. 4 is a flow diagram of method steps for automatically determining the timing of linearly dependent events to optimize overall execution of an activity, according to various embodiments of the present invention.

FIG. 4 is a flow diagram of method steps for automatically determining the timing of linearly dependent events to optimize overall execution of an activity, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the setup engine 140 initializes a new dynamic scheduled sequence of events 180 based on interactions with the organizer 122 and, optionally, the historical database 190. At step 404, for each delegated event, the setup engine 140 sends the delegation email 210 to the associated delegate 122 and the response engine 150 adjusts the dynamic scheduled sequence of events 180 based on the response to the delegation email 210. At step 406, the progression engine 160 generates a start event and sets a current event equal to the start event. At step 408, the progression engine 160 updates the dynamic scheduled sequence of events 180 based on interactions with the organizer 122 and the delegates 120 until the current time is equal to the scheduled activity start 184.

At step 410, the progression engine 160 updates the dynamic scheduled sequence of events 180 and the scheduling GUI 162 based on the current time. At step 412, the progression engine 160 determines whether the completion of the current event is overdue or the progression engine 160 has received a re-scheduling request. If, at step 412, the progression engine 162 determines that completion of the current event is overdue and/or the progression engine 160 has received a re-scheduling request, then the method 400 proceeds to step 414. At step 414, the progression engine 160 adapts the dynamic scheduled sequence of events 180 to reflect that the completion of the current event is overdue and/or to reflect the re-scheduling request. The method 400 then returns to step 410, where the progression engine 160 updates the dynamic scheduled sequence of events 180 and the scheduling GUI 162 based on the current time.

If, however, at step 412, the progression engine 160 determines that the completion of the current event is not overdue and the progression engine 160 has not received a re-scheduling request, then the method 400 proceeds directly to step 416. At step 416, the progression engine 160 determines whether the current event is complete. If, at step 416, the progression engine 160 determines that the current event is not complete, then the method 400 returns to step 410, where the progression engine 160 updates the dynamic scheduled sequence of events 180 and the scheduling GUI 162 based on the current time.

If, however, at step 416, the progression engine 160 determines that the current event is complete, then the method 400 proceeds directly to step 418. At step 418, the progression engine 160 determines whether the actual duration associated with the current event is less than the scheduled duration associated with the current event. If, at step 418, the progression engine 160 determines that the actual duration associated with the current event is less than the scheduled duration associated with the current event, then the method 400 proceeds to step 420, At step 420, the progression engine 160 adapts the dynamic scheduled sequence of events 180 to reflect that the actual duration associated with the current event is less than the scheduled duration associated with the current event.

If, however, at step 418, the progression engine 160 determines that the actual duration associated with the current event is not less than the scheduled duration associated with the current event, then the method 400 proceeds directly to step 422. At step 422, the progression engine 160 determines whether the activity associated with the dynamic scheduled sequence of events 180 is complete. If, at step 422, the progression engine 160 determines that the activity associated with the dynamic scheduled sequence of events 180 is not complete, then the method 400 proceeds to step 424. At step 424, the progression engine 160 sets the current event to the next event included in the scheduled sequence of events 188. The method 400 then returns to step 410, where the progression engine 160 updates the dynamic scheduled sequence of events 180 and the scheduling GUI 162 based on the current time.

If, however, at step 422, the progression engine 160 determines that the activity associated with the dynamic scheduled sequence of events 180 is complete, then the method 400 proceeds directly to step 426. At step 426, the progression engine 160 updates the historical database 190. More specifically, the progression engine 160 stores the scheduled activity start 184, the actual activity start 174, the scheduled activity duration 186, and the actual activity duration 176 in the historical database 190. Further, for each event, the progression engine stores the owner, the scheduled duration, and the actual duration. The method 400 then terminates.

In sum, the disclosed techniques may be used to automatically generate and update a dynamic scheduled sequence of events in real-time based on input from users and the actual duration of events. The scheduling subsystem includes, without limitation, a setup engine, a response engine, a progression engine, and a scheduling engine. In operation, an organizer initializes a new dynamic scheduled sequence of events via the setup engine. The organizer specifies a user list, the scheduled activity start, the scheduled activity duration, any number of static events, and any number of delegated events Each static event is an event that is associated with a fixed duration, an owner, and a topic. Each delegated event is an event that is associated with a delegate that is also the owner.

For each delegated event, the setup engine generates an email requesting input from the associated delegate. In response to the email for a given delegated event, the associated delegate interacts with the response engine to assign a duration and, optionally, a topic to the delegated event. Prior to the scheduled activity start, the scheduling engine performs scheduling operations to generate a scheduled sequence of events that includes the events. Further, the scheduling engine generates a start event that immediately precedes the first event included in the scheduled sequence of events.

When the current time is equal to the scheduled activity start time, the progression engine sets a current event equal to the start event and begins to track the progression of the activity via a scheduling GUI. The scheduling GUI visually depicts the scheduled sequence of events along with highlights and/or annotations that indicate the current time, the current event, and the progression of the activity with respect to the current time.

Notably, if the progression engine detects that the current event has not completed as scheduled, then the progression engine indicates the delay via the agenda GUI. The progression engine then modifies subsequent events and/or the scheduled activity duration based on the delay. Upon receiving user input that the next event is starting, the progression engine updates the scheduled sequence of events based on the completion of the current event. The progression engine then highlights the next event as the new current event. In general, during the activity, the progression engine may update the timing of any of the events and/or the scheduled activity duration based on user input from the participants (including the organizer).

The progression engine continues to track the progression of the activity, update the dynamic scheduled sequence of events, and update the scheduling GUI in this fashion until receiving user input that the activity is complete. Subsequently, the progression engine stores information associated with the activity and information associated with each of the events in a historical database.

At least one improvement of the disclosed techniques relative to prior art is that automatically updating scheduled sequences of events based on the current time reduces the inefficiencies typically associated with prior art scheduling techniques. In particular, when the activity is a meeting and the scheduled sequence of events is an agenda, the organizer does not need to manually track the meeting time and adapt the agenda as the meeting progresses. Further, displaying an up-to-date agenda cultivates awareness of the current progression of the meeting among the attendees, enabling the attendees to adjust behaviors and/or the timing of their events in an informed fashion. In general, because the scheduled sequence of events is automatically generated via crowd-sourcing, discrepancies between the scheduled duration of events and the actual durations of the events are reduced. These technical advantages provide a substantial technological advancement over prior art solutions.

1. In some embodiments, a computer-implemented method for automatically determining the timing of linearly dependent events comprises detecting that a first event included in an original scheduled sequence of events has not completed by a scheduled completion time based on a current time; determining that a second event included in the original scheduled sequence of events has a first dependency on the completion of the first event; updating one or more temporal properties associated with the second event based on the current time to generate a third event; and generating, via a processor, a modified scheduled sequence of events that includes the third event instead of the second event.

2. The computer-implemented method of clause 1, wherein detecting that the first event has not completed by the scheduled completion time comprises determining that the first event is in progress and that the current time is later than the scheduled completion time.

3. The computer-implemented method of clauses 1 or 2, further comprising determining that the first event is still in progress based on input received via a user interface.

4. The computer-implemented method of any of clauses 1-3, wherein determining that the second event has the first dependency comprises determining that the second event is subsequent to the first event in a timeline defined by the original scheduled sequence of events.

5. The computer-implemented method of any of clauses 1-4, wherein the one or more temporal properties associated with the second event comprises at least one of a scheduled start time, a different scheduled completion time, and a scheduled duration.

6. The computer-implemented method of any of clauses 1-5, wherein updating the one or more temporal properties associated with the second event comprises computing a delay based on the current time and the scheduled completion time; computing a compression factor based on the delay and a scheduled completion time associated with the original scheduled sequence of events; computing a scheduled start time associated with the third event based on the delay and a scheduled start time associated with the second event; and computing a scheduled duration associated with the third event based on the contraction factor and a scheduled duration associated with the second event.

7. The computer-implemented method of any of clauses 1-6, further comprising, prior to detecting that the first event has not completed, generating a first email associated with a delegated event; transmitting the first email to a first user; and generating the first event and the original sequence of unscheduled events based on a first duration specified in an electronically-communicated response to the first email.

8. The computer-implemented method of any of clauses 1-7, further comprising, updating a graphical user interface to indicate that the first event has not completed by the scheduled completion time.

9. The computer-implemented method of any of clauses 1-8, wherein the original scheduled sequence of events comprises an agenda, and the first event comprises an agenda item that is associated with a first meeting attendee.

10. The computer-implemented method of any of clauses 1-9, further comprising detecting that the third event completed before a scheduled completion time associated with the third event; determining that a fourth event included in the modified scheduled sequence of events has a second dependency on the completion of the third event; updating one or more temporal properties associated with the fourth event based on the current time to generate a fifth event; and generating, via a processor, a new modified scheduled sequence of events that includes the fifth event instead of the fourth event.

11. In some embodiments, a computer-readable storage medium includes instructions that, when executed by a processor, cause the processor to automatically determine the timing of linearly dependent events by performing the steps of detecting that a first event included in an original scheduled sequence of events has not completed by a scheduled completion time based on a current time; determining that a second event included in the original scheduled sequence of events has a first dependency on the completion of the first event; updating one or more temporal properties associated with the second event based on the current time to generate a third event; and generating, via a processor, a modified scheduled sequence of events that includes the third event instead of the second event.

12. The computer-readable storage medium of clause 11, wherein detecting that the first event has not completed by the scheduled completion time comprises determining that the first event is in progress and that the current time is later than the scheduled completion time.

13. The computer-readable storage medium of clauses 11 or 12, wherein determining that the second event has the first dependency comprises determining that the second event is subsequent to the first event in a timeline defined by the original scheduled sequence of events.

14. The computer-readable storage medium of any of clauses 11-13, wherein the one or more temporal properties associated with the second event comprises at least one of a scheduled start time, a different scheduled completion time, and a scheduled duration.

15. The computer-readable storage medium of any of clauses 11-14, wherein updating the one or more temporal properties associated with the second event comprises computing a delay based on the current time and the scheduled completion time; computing a scheduled duration associated with a first buffer based on the delay and a scheduled duration associated with a second buffer included in the original scheduled sequence of events; and computing a scheduled start time associated with the third event based on the delay and a scheduled start time associated with the second event.

16. The computer-readable storage medium of any of clauses 11-15, wherein generating the modified sequence of linearly dependent events comprises aggregating at least the first event, the third event, and the first buffer.

17. The computer-readable storage medium of any of clauses 11-16, further comprising, prior to detecting that the first event has not completed, generating a first email associated with a delegated event; transmitting the first email to a first user; and generating the first event and the original sequence of unscheduled events based on a first duration specified in an electronically-communicated response to the first email.

18. The computer-readable storage medium of any of clauses 11-17, wherein the original scheduled sequence of events comprises a Gantt chart and the first event comprises a first project deliverable, a first project milestone, or a first project activity.

19. The computer-readable storage medium of any of clauses 11-18, further comprising storing, in a historical database, information indicating that a first user associated with the first event did not complete the first event by the scheduled completion time; and generating a new scheduled sequence of events that includes a fourth event associated with the first user based on the historical database and input received from the first user.

20. In some embodiments, a system comprises a memory storing instructions; and a processor that is coupled to the memory and, when executing the instructions, is configured to detect that a first event included in an original scheduled sequence of events has not completed by a scheduled completion time based on a current time; determine that a second event included in the original scheduled sequence of events has a first dependency on the completion of the first event; update one or more temporal properties associated with the second event based on the current time to generate a third event; and generate, via a processor, a modified scheduled sequence of events that includes the third event instead of the second event.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically determining a timing of linearly dependent events, the method comprising:
    storing, in a historical computer database, a history of completed events and users associated with the completed events;
    identifying a current event having a first scheduled duration included in an original scheduled sequence of events comprising a plurality of events, wherein a first user is responsible for the current event;
    generating a graphical representation of the original scheduled sequence of events including a first graphical representation for the current event based on the first scheduled duration;
    analyzing the historical computer database to determine that one or more completed events associated with the first user have exceeded one or more scheduled durations associated with the one or more completed events;
    in response, automatically generating a modified graphical representation of the original scheduled sequence of events by automatically compressing the first graphical representation for the current event to visually represent a second duration that is shorter than the first scheduled duration;
    in response, automatically displaying the modified graphical representation of the original scheduled sequence of events to the first user via a graphical user interface;
    detecting, via a scheduling system, that a first event included in the original scheduled sequence of events has not completed by a scheduled completion time by a current delay based on a current time;

determining that a second event included in the original scheduled sequence of events has a first dependency on the completion of the first event;

updating one or more temporal properties associated with the second event based on the current delay and the current time to generate a third event;

generating, via a processor, a modified scheduled sequence of events that includes the third event instead of the second event; and causing, via the scheduling system, the graphical user interface to illustrate modifications to the original scheduled sequence of events to be displayed in real-time by continually updating the one or more temporal properties associated with the second event based on the current delay and the current time and continually generating the modified scheduled sequence of events.

2. The computer-implemented method of claim 1, wherein detecting that the first event has not completed by the scheduled completion time comprises determining that the first event is in progress and that the current time is later than the scheduled completion time.

3. The computer-implemented method of claim 2, further comprising determining that the first event is still in progress based on input received via the graphical user interface.

4. The computer-implemented method of claim 1, wherein determining that the second event has the first dependency comprises determining that the second event is subsequent to the first event in a timeline defined by the original scheduled sequence of events.

5. The computer-implemented method of claim 1, wherein the one or more temporal properties associated with the second event comprises at least one of a scheduled start time, a different scheduled completion time, and a scheduled duration.

6. The computer-implemented method of claim 1, wherein updating the one or more temporal properties associated with the second event comprises:

computing the current delay based on the current time and the scheduled completion time;

computing a compression factor based on the current delay and a scheduled completion time associated with the original scheduled sequence of events;

computing a scheduled start time associated with the third event based on the delay and a scheduled start time associated with the second event; and computing a scheduled duration associated with the third event based on the compression factor and a scheduled duration associated with the second event.

7. The computer-implemented method of claim 1, further comprising, prior to detecting that the first event has not completed:

generating a first email associated with a delegated event;

transmitting the first email to a second user; and generating the first event and the original sequence of scheduled events based on a first duration specified in an electronically-communicated response to the first email.

8. The computer-implemented method of claim 1, further comprising, updating the graphical user interface to indicate that the first event has not completed by the scheduled completion time.

9. The computer-implemented method of claim 1, wherein the original scheduled sequence of events comprises an agenda, and the first event comprises an agenda item that is associated with a first meeting attendee.

10. The computer-implemented method of claim 1, further comprising:

detecting that the third event completed before a scheduled completion time associated with the third event;

determining that a fourth event included in the modified scheduled sequence of events has a second dependency on the completion of the third event;

updating one or more temporal properties associated with the fourth event based on the current time to generate a fifth event; and generating, via a processor, a new modified scheduled sequence of events that includes the fifth event instead of the fourth event.

11. One or more non-transitory computer-readable media including instructions that, when executed by one or more processors, cause the one or more processors to automatically determine a timing of linearly dependent events by performing the steps of:

storing, in a historical computer database, a history of completed events and users associated with the completed events;

identifying a current event having a first scheduled duration included in an original scheduled sequence of events comprising a plurality of events, wherein a first user is responsible for the current event;

generating a graphical representation of the original scheduled sequence of events including a first graphical representation for the current event based on the first scheduled duration;

analyzing the historical computer database to determine that one or more completed events associated with the first user have exceeded one or more scheduled durations associated with the one or more completed events;

in response, automatically generating a modified graphical representation of the original scheduled sequence of events by automatically compressing the first graphical representation for the current event to visually represent a second duration that is shorter than the first scheduled duration;

in response, automatically displaying the modified graphical representation of the original scheduled sequence of events to the first user via a graphical user interface;

detecting, via a scheduling system, that a first event included in the original scheduled sequence of events has not completed by a scheduled completion time by a current delay based on a current time;

determining that a second event included in the original scheduled sequence of events has a first dependency on the completion of the first event;

updating one or more temporal properties associated with the second event based on the current delay and the current time to generate a third event;

generating, via a processor, a modified scheduled sequence of events that includes the third event instead of the second event; and causing, via the scheduling system, the graphical user interface to illustrate modifications to the original scheduled sequence of events to be displayed in real-time by continually updating the one or more temporal properties associated with the second event based on the current delay and the current time and continually generating the modified scheduled sequence of events.

12. The one or more non-transitory computer-readable media of claim 11, wherein detecting that the first event has not completed by the scheduled completion time comprises determining that the first event is in progress and that the current time is later than the scheduled completion time.

13. The one or more non-transitory computer-readable media of claim 11, wherein determining that the second event has the first dependency comprises determining that the second event is subsequent to the first event in a timeline defined by the original scheduled sequence of events.

14. The one or more non-transitory computer-readable media of claim 11, wherein the one or more temporal properties associated with the second event comprises at least one of a scheduled start time, a different scheduled completion time, and a scheduled duration.

15. The one or more non-transitory computer-readable media of claim 11, wherein updating the one or more temporal properties associated with the second event comprises:
   computing the current delay based on the current time and the scheduled completion time;
   computing a scheduled duration associated with a first buffer based on the current delay and a scheduled duration associated with a second buffer included in the original scheduled sequence of events; and
   computing a scheduled start time associated with the third event based on the current delay and a scheduled start time associated with the second event.

16. The one or more non-transitory computer-readable media of claim 15, wherein generating the modified scheduled sequence of events comprises aggregating at least the first event, the third event, and the first buffer.

17. The one or more non-transitory computer-readable media of claim 11, further comprising, prior to detecting that the first event has not completed:
   generating a first email associated with a delegated event;
   transmitting the first email to a second user; and
   generating the first event and the original sequence of scheduled events based on a first duration specified in an electronically-communicated response to the first email.

18. The one or more non-transitory computer-readable media of claim 11, wherein the original scheduled sequence of events comprises a Gantt chart and the first event comprises a first project deliverable, a first project milestone, or a first project activity.

19. A system, comprising:
   a memory storing instructions; and
   a processor that is coupled to the memory and, when executing the instructions:
      stores, in a historical computer database, a history of completed events and users associated with the completed events;
      identifies a current event having a first scheduled duration included in an original scheduled sequence of events comprising a plurality of events, wherein a first user is responsible for the current event;
      generates a graphical representation of the original scheduled sequence of events including a first graphical representation for the current event based on the first scheduled duration;
      analyzes the historical computer database to determine that one or more completed events associated with the first user have exceeded one or more scheduled durations associated with the one or more completed events;
      in response, automatically generates a modified graphical representation of the original scheduled sequence of events by automatically compressing the first graphical representation for the current event to visually represent a second duration that is shorter than the first scheduled duration;
      in response, automatically displays the modified graphical representation of the original scheduled sequence of events to the first user via a graphical user interface;
      detects that a first event included in the original scheduled sequence of events has not completed by a scheduled completion time by a current delay based on a current time;
      determines that a second event included in the original scheduled sequence of events has a first dependency on the completion of the first event;
      updates one or more temporal properties associated with the second event based on the current delay and the current time to generate a third event;
      generates a modified scheduled sequence of events that includes the third event instead of the second event; and
      causes the graphical user interface to illustrate modifications to the original scheduled sequence of events to be displayed in real-time by continually updating the one or more temporal properties associated with the second event based on the current delay and the current time and continually generating the modified scheduled sequence of events.

20. The computer-implemented method of claim 1, wherein the first user pattern indicates that the first user did not complete the at least one completed event by a scheduled completion time, the method further comprising determining a sequence position of the current event in the original scheduled sequence of events based on the first user pattern.

21. The computer-implemented method of claim 1, wherein:
   the first user pattern indicates that the first user did not complete the at least one completed event by a scheduled completion time; and
   the current graphical representation for the current event is generated by visually compressing an original graphical representation for the current event that visually represents the first duration by a compression factor to generate the current graphical representation.

22. The computer-implemented method of claim 21, wherein generating the graphical representation of the original scheduled sequence of events comprises generating another graphical representation for another event included in the plurality of events by visually expanding the another graphical representation for the another event based on the compression factor.

* * * * *